US012577160B2

(12) United States Patent
Yaw

(10) Patent No.: US 12,577,160 B2
(45) Date of Patent: Mar. 17, 2026

(54) AIR-DRY SCULPTURAL AND MODELING CLAY

(71) Applicant: Form Flex Compound, Springfield, OR (US)

(72) Inventor: Tammy Yaw, Springfield, OR (US)

(73) Assignee: Form Flex Compound, Springfield, OR (US)

( * ) Notice: Subject to any disclaimer, the term of this patent is extended or adjusted under 35 U.S.C. 154(b) by 658 days.

(21) Appl. No.: 18/010,933

(22) PCT Filed: Jun. 11, 2021

(86) PCT No.: PCT/US2021/037040
§ 371 (c)(1),
(2) Date: Dec. 16, 2022

(87) PCT Pub. No.: WO2021/257402
PCT Pub. Date: Dec. 23, 2021

(65) Prior Publication Data
US 2023/0234887 A1     Jul. 27, 2023

Related U.S. Application Data

(60) Provisional application No. 63/041,708, filed on Jun. 19, 2020.

(51) Int. Cl.
| | |
|---|---|
| *C04B 26/00* | (2006.01) |
| *C04B 24/08* | (2006.01) |
| *C04B 24/16* | (2006.01) |
| *C04B 26/10* | (2006.01) |
| *C04B 103/44* | (2006.01) |

(52) U.S. Cl.
CPC .............. *C04B 26/10* (2013.01); *C04B 24/08* (2013.01); *C04B 24/168* (2013.01); *C04B 2103/44* (2013.01)

(58) Field of Classification Search
CPC ....... C04B 26/10; C04B 24/08; C04B 24/168; C04B 2103/44
USPC ....................................................... 106/206.1
See application file for complete search history.

(56) References Cited

U.S. PATENT DOCUMENTS

| | | |
|---|---|---|
| 2016/0068435 A1 | 3/2016 | Daniels et al. |
| 2016/0137821 A1* | 5/2016 | Doane, Jr. ................. C08L 3/00 |
| | | 524/13 |
| 2017/0283591 A1 | 10/2017 | Okel et al. |
| 2019/0016877 A1 | 1/2019 | Moskal et al. |
| 2020/0010365 A1 | 1/2020 | Votel |

OTHER PUBLICATIONS

International Search Report and Written Opinion for PCT Application No. PCT/US2021/037040, mailed Sep. 15, 2021, 9 pages.

* cited by examiner

*Primary Examiner* — James E Mcdonough
(74) *Attorney, Agent, or Firm* — Ganz Law, P.C.

(57) ABSTRACT

An air-dry clay moldable and workable for sculptural applications, comprising a formulation of: (1) caulk or caulk base material and (2) a thickening agent and/or a detackifier in sufficient proportions to form a clay that can air dry to a substantially solid form at room temperature. The clay may include both a thickening agent and detackifier. The caulk or caulk base material comprises by weight percent: 40-90%, or 50-80%, or 60-75% of the formulated clay.

14 Claims, No Drawings

AIR-DRY SCULPTURAL AND MODELING CLAY

BACKGROUND

The inventive subject matter generally relates to air-dry sculptural and modeling clays used in hobbies, arts and crafts, and home decor projects. They may be sculpted by hand into desired shapes or placed in shaped molds. The clays dry to a substantially solid form. Formed objects may be decorative or functional. They may be used indoors or outdoors.

Conventional air-dry clays are usually water-based clay. Air-dry clay does not need to be kiln-fired or oven dried, like earthen and polymer clays. It cures at room temperature or ambient air, without application of heat. Air-dry clay can be made from natural materials, polymers or a combination of materials like paper fibers and glue. One homemade air-dry clay is made from a reactive mixture of baking soda, corn starch and water, which are heated together.

There are certain characteristics that clay should possess to be considered suitable for sculpting. These include smoothness, bendability, stiffness, resistance to shrinkage and cracking.

Unfortunately, conventional air-dry clays have disadvantages, including they may erode, crack or otherwise degrade under environmental conditions like moisture, humidity, or heat, or, when dried to a solid, they may be too fragile for handling or other contact. Accordingly, there is a substantial need for improved clay formulations that do not suffer from such disadvantages.

SUMMARY

The inventive subject matter provides an air-dry clay that is suitable for many different kinds of uses. It is ideal for hobbies, crafts, and home décor with creative imagination for special effects. Its overall combination of softness, pliability, and moldability, producing sharp, crisp, clear details, and its resistance to environmental conditions, including heat, water and weather, make it a substantial improvement over conventional air-dry clays. The inventive clay dries relatively quickly with minimal to no shrinkage or cracking while retaining flexibility. It is compatible with all types of paints, stains, and waxes, Its finish may be protected by sealing.

In one possible embodiment, the inventive subject matter is directed to an air-dry clay moldable and workable for sculptural applications, comprising a formulation of: (1) caulk or caulk base material and (2) a thickening agent and/or a detackifier in sufficient proportions to form a clay that can air dry to a substantially solid form at room temperature. The clay may include both a thickening agent and detackifier. The caulk or caulk base material may comprise by weight percent: 40-90%, or 50-80%, or 60-75% of the formulated clay. The thickening agent may comprise by weight percent: 20-60%, or 25-50%, 30-40% of the formulated clay. The detackifier may comprise by weight percent: 1-10%, or 1-7%, or 2-5% of the formulated clay. The caulk or caulk material comprises one or more of acrylic latex, silicone, polyurethane, polysulfides, and rubber. The thickening agent may comprise one or more of a bio-based starch. The bio-based starch may comprise corn starch. The detackifier may comprise a mineral or vegetable oil. The oil may comprise a biocompatible mineral oil like baby oil.

The inventive subject matter is further directed to all other inventive concepts, described herein, including all contemplated clay formulations and methods of making and using the formulated clays.

These and other embodiments are described in more detail in the following detailed descriptions.

The following is a description of various inventive lines under the inventive subject matter. The appended claims, as originally filed in this document, or as subsequently amended, are hereby incorporated into this Summary section as if written directly in.

The foregoing is not intended to be an exhaustive list of embodiments and features of the inventive subject matter. Persons skilled in the art are capable of appreciating other embodiments and features from the following detailed description.

DETAILED DESCRIPTION

The inventive subject matter is directed to an air-dry sculptural clay that includes plastic caulking base material combined with a thickening agent and/or a detackifier. Conventional caulking is used in building and construction industries as a plastic agent that has sufficient fluidity for filling gaps and small openings, curing to a soft form. It is not known as a sculpting clay for use in arts and crafts and other sculptural endeavors because of certain undesirable properties, which would have discouraged artisans and craftspersons from considering it for use as an air-dry clay.

For example, it is too fluid to be molded into complex or relatively large shapes. It has adhesive properties and is therefore too sticky to work by hand. Yet it has certain desirable properties like flexibility, durability, water and weather resistance, thermal stability.

It has been advantageously found that caulking or caulking base materials can be combined with certain other materials to create an improved air-dry sculptural clay with advanced properties. Using caulking material as a base plastic material takes advantage of the flexibility, durability, water and weather resistance, and thermal stability inherent in the caulking material. A thickening agent is combined with the caulking material to thicken the clay formulation, making it more workable and substantially solid so that it holds its form during use. A handling agent may be combined with the caulking material, making the clay less sticky or tacky and more handleable (hereinafter, the handling agent may be referred to as a "detackifier"). In the following sections, each component of the formulation is discussed in more detail.

Caulk

Caulks are plastic or plasticizable materials. Generally, and as used herein, caulk means synthetic polymeric material that dries or cures to a soft, semi-solid, monolithic form. Common caulks have been developed for construction and repair trades to fill small gaps and holes. Such caulks are typically made from one of or more of four base compounds: acrylic latex, silicone, polyurethane, polysulfides, or rubber.

Latex and acrylic caulks are water-based and made up of synthetic polymers that resemble natural latex—but there is no actual latex in them. They are an umbrella term, and within this category of synthetic water-based caulks are a variety of known specific types.

Silicone rubber is an elastomer (rubber-like material) composed of silicon polymer—containing silicon together with carbon, hydrogen, and oxygen. Silicone rubbers are widely used in industry, and there are many formulations.

Polyurethanes are formed by reacting a polyol (an alcohol with more than two reactive hydroxyl groups per molecule) with a diisocyanate, or a polymeric isocyanate the presence of suitable catalysts and additives.

Polysulfides are a class of chemical compounds containing chains of sulfur atoms. Many commercial elastomers contain polysulfides as crosslinks. Polysulfide caulks should not be used on plastics as they will degrade the plastic they are attached to.

Most typically, acrylic, latex, and silicone, combined in various ways, are the three basic ingredients used to make caulk. Preferably, the caulk is free of mineral spirits, to help avoid handling risks. However, caulks with mineral spirits may be suitable for applications where the mineral spirits are found safe or proper health and safety measures are in place during use.

Commercially available caulk without mineral spirits includes Acrylic Latex Caulk (available with or without silicone), available from DAP Products, Inc., of Maryland, USA. One hundred percent silicone formulas such as Dow Corning's 100 Percent Silicone Sealant are also made without mineral spirits and are inert when dried. Both products are widely available. Another caulk that is believed to be a suitable caulk material for use in the inventive formulations is Safecoat™ Caulking Compound, a nontoxic, water-based caulk made from a modified acrylic copolymer.

To address possible health risks, it is recommended that selected caulks be free of known, significant toxic elements. Some caulks are certified to meet low-toxicity standards. For example, Green Guard Golf™ certified caulks may provide a higher margin of safety compared with uncertified caulks. For more information on caulk toxicity issues, see https://www.ewg.org/healthyhomeguide/caulk-sealants-adhesives/

Thickening Agent

A thickening agent or thickener is a substance which can increase the viscosity of a liquid without substantially changing its other properties. The inventive subject matter contemplates thickening agents that are bio-based, as well as synthetics. Bio-based thickeners are particularly suitable for their biocompatibility and low cost. Bio-based thickeners may be based on either polysaccharides (starches, vegetable gums, and pectin), or proteins.

Starches are long chains of sugar molecule that are found in the form of tiny, dry granules, in all plants.

Cornstarch: Cornstarch, corn flour, or maize starch is the starch derived from the corn (maize) grain or wheat. The starch is obtained from the endosperm of the kernel. It has been found to be a particularly suitable thickening agent for use in the inventive clay formulations disclosed and contemplated herein.

Other natural starches are expected to be suitable thickening agents. The following, non-limiting listing of starches are among those contemplated as suitable: potato starch, arrowroot, katakuri starch, sago, wheat flour, almond flour, tapioca and their starch derivatives.

Microbial and vegetable gums usable as thickeners may include alginin, guar gum, locust bean gum, and xanthan gum. Proteins usable as thickeners may include collagen, casein, albumin, egg whites, and gelatin. Sugar polymers include agar, carboxymethyl cellulose, pectin and carrageenan. Other thickening agents act on the proteins already present in a mixture. One example is sodium pyrophosphate, which acts on casein in milk during the preparation of instant pudding.

Some thickening agents are gelling agents (gellants), forming a gel, dissolving in the liquid phase as a colloid mixture that forms a weakly cohesive internal structure.

Typical gelling agents include natural gums, starches, pectins, agar-agar and gelatin. Often, they are based on polysaccharides or proteins.

Other thickening agents act as mechanical thixotropic additives with discrete particles adhering or interlocking to resist strain.

Different thickeners may be more or less suitable in a given application, due to differences in clarity and their responses to chemical and physical conditions. For example, for acidic mixtures, arrowroot is a better choice than cornstarch, which may lose thickening potency in acidic mixtures. At (acidic) pH levels below 4.5, guar gum has sharply reduced aqueous solubility, thus also reducing its thickening capability. If the formulation is to be frozen, tapioca or arrowroot are preferable over cornstarch, which becomes spongy when frozen.

Non-bio-based thickening agents may also be suitable for use in the inventive clay formulations. For example, mechanical and thixotropic agents may be usable. For instance, fumed silica and similar products form stiff microscopic chains or fibers that interlock or agglomerate into a mass, holding the associated liquid by surface tension, but which can separate or slide when sufficient force is applied. This causes the thixotropic or shear-thinning property (also frequently exhibited by gels), where the viscosity is non-Newtonian and becomes lower as the shearing force or time increases; their usefulness is primarily that the resulting increase in viscosity is large compared to the quantity of silica added. Fumed silica is generally accepted as safe as a food additive and is frequently used in cosmetics. Additives such as precipitated silica, fine talc, or chalk also meet the definition of thickening agent in that they increase viscosity and body while not affecting the target property of a mixture.

Thickening agents used in cosmetics or personal hygiene may also be usable in the inventive clay formulations. These include viscous liquids such as polyethylene glycol, synthetic polymers such as carbomer (a trade name for polyacrylic acid) and vegetable gums. Some thickening agents may also function as stabilizers when they are used to maintain the stability of an emulsion. Some emollients, such as petroleum jelly and various waxes may also function as thickening agents in an emulsion.

Cellulosics like CMC, HMC, HPMC, and others, all are chemically substituted cellulose macromolecules, which may be suitable thickening agents. The hydroxyl groups are what gets substituted by other functional groups, such as methoxy or propyl. The amount of substitution and molecular weight determine viscosity of the solution, assuming concentration stays the same; adding more also increases viscosity.

Modified castor oil may be a suitable thickening agent. Like cellulose, castor oil has hydroxyl groups, unlike other oils, which at most have double bonds, which castor oil also has, but most substitutions occur at the hydroxyl moieties, allowing exotic derivatives with myriad properties.

Detackifier

The inventive subject matter may use a detackifier to mitigate the stickiness of the caulk base material. A suitable oil may be added to the formulation for this purpose. One suitable oil is mineral. The mineral oil may be a common baby oil. Typical components of baby oils are highly purified mineral oil products such as liquid paraffin (International Nomenclature of Cosmetic Ingredients (INCI) name: paraffinum liquidum) and Vaseline™ (INCI name: petrolatum). These compounds are odorless and tasteless, and may be dermatologically tested and approved, not allergenic, hydrophobic, and contain no pesticides or herbicides.

The following, non-limiting listing of vegetable oils are among those contemplated as suitable for use in the inventive clay formulations: Cocos Nucifera Oil (coconut oil), Elaeis Guineensis Oil (palm oil), Glycine Soja Oil (soya oil), hydrogenated olive oil, Persea Gratissima Oil (avocado oil), Prunus Amygdalus Dulcis Oil (almond oil), Shea Butter Glycerides (shea butter), Simmondsia chinensis Oil (jojoba oil), and Helianthus Annuus Seed Oil (sunflower oil).

Non-Limiting Example Clay Formulations

Ingredient Percentages by weight (grams)

Regular 2,267.73 g Batch

| WHITE CAULK | 935.30 g. | 41.25% |
| CORN STARCH | 701.65 g. | 30.93% |
| CLEAR CAULK | 574.08 g. | 25.32% |
| BABY OIL | 56.70 g. | 2.5% |
| TOTAL | 2,267.73 g. | 100% |

The formulation uses two tubes of white all-purpose acrylic latex caulk plus silicone, two tubes of clear all-purpose acrylic latex caulk plus silicone, four and a half cups of cornstarch, and five tablespoons of baby oil. Each tube of caulking weighs out at about 286.33 g. and the batch of completed compound weighs 2.72 kg. Everything is mixed until incorporated then finished by kneading by hand. This can be made into larger volumes using this formula. Then one-pound pieces are measured out and wrapped in parchment paper for storage in sealed baggies. This cart be stored in the freezer for later usage or placed on a shelf as long as the seal is tight. Finished pieces can be stored in an airtight container with parchment paper in between the layers to retain all flexibility.

DAP brand caulking is a particularly suitable brand that because it has been found to have minimal shrinkage compared two other brands. Further, a combination of the elements that are in both white and clear caulk may produce more optimal clay.

Mixing: Spray inside of mixing receptacle with lubricant (e.g., cooking spray), place all ingredients into receptacle large enough to allow free movement. Mix for 5 minutes with electric type mixer, then kneading by hand making sure all ingredients are combined to form a dough like consistency. Then wrap in one-pound portions covered in parchment paper in airtight bag.

Detailed Mixing Instructions for 2,267.73 g Batch:

WHITE CAULK 935.30 g.

CLEAR CAULK 574.08 g.

CORN STARCH 701.65 g.

BABY OIL 56.70 g.

Bend with electric mixer approximately 5 minutes (until dough like consistency is achieved) Hand knead for approximately 3 minutes. Mixed at temperature between 55°-80° F. with no difference in finished product performance. Based on the foregoing examples, it is expected that suitable clay formulations may have ingredients in the following percentages:

Caulk or caulk base material: 40-90%, or 50-80%, or 60-75%.

Thickening agent: 20-60%, or 25-50%, 30-40%.

Detackifier: 1-10%, or 1-7%, or 2-5%.

The appropriate weight percentages may vary depending on the specific ingredients used and the properties desired, with different desired formulations being developable without undue experimentation using the teachings herein as a guide.

In general, small to medium size objects may dry to a usable state in as soon as 15 minutes and within 24 hours, but there are variables, including thickness or material, temperature of the drying room, degree of air movement, and in some cases, drying may take 24 hours or more.

Instructions how to Use with Silicone Molds:

1. Use clean silicone mold dusted lightly with cornstarch to prevent sticking.

2. Remove desired amount of day that you will be used and work with gloved hands to soften. (applying baby oil to hands may help to prevent sticking)

3. Roll into snake-like form, starting at the edge of casting, push clay n place Tilling mold to desired level.

4. Smooth back using a flat edge to evenly distribute the compound into all crevices of the mold. Use flat edge to remove excess compound from edges and cut outs. (Note: excess compound can be saved and returned to parchment paper in sealed bag.)

5. To refine edges use finger or slightly damp sponge and wipe around the edges to remove any shadow. Optional.)

6. Place mold in freezer with compound side up for around 10 minutes, which can vary depending on size.

7. Remove mold from freezer. Release sides by flexing mold slightly, with compound side on a flat surface, and then release mold entirely.

*If using immediately, allow at least 10 minutes for molded compound to come to room temperature then molded accent can then be applied to any project with proper compatible bonding agent.

**If desired, molded accent can be air dried on a flat surface lined with parchment paper until a slight crust forms on top. Usually 24 hours is suggested for this method. Store in an airtight container with parchment paper in between layers. Compound will remain flexible when stored properly.

8. Finish with desired method, paint, wax, or stain then seal to complete project.

In conclusion, the inventive subject matter provides an air-dry clay that is suitable for many different kinds of uses. It is ideal for hobbies, crafts, home décor with creative imagination for special effects. Its overall combination of softness, and pliability, and moldability, with sharp, crisp, clear details, and its resistance to environmental conditions, including heat, water and weather, make it a substantial improvement over conventional air-dry clays. The inventive clay dries with minimal to no shrinkage or cracking while retaining flexibility. It is compatible with all types of paints, stains, and waxes. Its finish may be protected by sealing.

Persons skilled in the art will recognize that many modifications and variations are possible in the details, materials, and arrangements of the parts and actions which have been described and illustrated in order to explain the nature of the inventive subject matter, and that such modifications and variations do not depart from the spirit and scope of the teachings and claims contained therein.

All patent and non-patent literature cited herein is hereby incorporated by references in its entirety for all purposes.

As used herein, "and/or" means "and" or "or", as well as "and" and "or." Moreover, any and all patent and non-patent literature cited herein is hereby incorporated by references in its entirety for all purposes.

The principles described above in connection with any particular example can be combined with the principles described in connection with any one or more of the other examples. Accordingly, this detailed description shall not be construed in a limiting sense, and following a review of this disclosure, those of ordinary skill in the art will appreciate the wide variety of systems that can be devised using the various concepts described herein. Moreover, those of ordinary skill in the art will appreciate that the exemplary embodiments disclosed herein can be adapted to various configurations without departing from the disclosed principles.

The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more".

All structural and functional equivalents to the elements of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed as "a means plus function" claim under US patent law, unless the element is expressly recited using the phrase "means for" or "step for".

The inventors reserve all rights to the subject matter disclosed herein, including the right to claim all that comes within the scope and spirit of the following claims:

The inventor reserves the right to claim, without limitation, at least the following subject matter.

The invention claimed is:

1. An air-dryable clay moldable and workable for sculptural applications, comprising:
   a blended formulation of:
   (1) a caulk or caulk base material comprising a mixture of acrylic acid, synthetic latex polymer, and silicone and wherein the mixture is 40%-90% by weight of the formulation before drying;
   (2) a thickening agent comprising a bio-based starch that is 20%-60% by weight of the blended formulation before drying; and
   (3) a detackifier that is 1%-10% by weight of the formulation before drying.

2. The clay of claim 1 wherein the bio-based starch is cornstarch.

3. The clay of claim 2 wherein the detackifier is a dermatologically compatible mineral oil.

4. The clay of claim 1 wherein the caulk or caulk-base material is a commercially available caulk.

5. The clay of claim 4 wherein the caulk or caulk base material is a blend of white and clear caulks.

6. The clay of claim 1 wherein (1) caulk or caulk base material comprising a mixture of acrylic acid, synthetic latex polymer, and silicone and wherein the mixture is 50%-80% by weight of formulation before drying; (2) a thickening agent comprising a bio-based starch that is 25%-50% by weight of the blended formulation before drying; and (3) a detackifier that is 1%-7% by weight of the formulation before drying.

7. The clay of claim 1 wherein (1) caulk or caulk base material comprising a mixture of acrylic acid, synthetic latex polymer, and silicone and wherein the mixture is 60%-75% by weight of the formulation before drying; (2) a thickening agent comprising a bio-based starch that is 30%-40% by weight of the blended formulation before drying; and (3) a detackifier that is 2%-5% by weight of the formulation before drying.

8. The clay of claim 7 wherein the caulk or caulk-base material is a commercially available caulk.

9. The clay of claim 8 wherein the caulk or caulk base material is a blend of white and clear caulks.

10. The clay of claim 7 wherein the blended formulation is free of water.

11. The clay of claim 9 wherein the blended formulation is free of water.

12. A method of making an air-dryable clay formulation that is moldable and workable for sculptural applications, comprising:
   providing a caulk or caulk base material comprising a mixture of acrylic acid, synthetic latex polymer, and silicone and wherein the mixture is 40%-90% by weight of formulation before drying;
   providing a thickening agent comprising a bio-based starch that is 20%-60% by weight of the blended formulation before drying;
   providing a detackifier that is 1%-10% by weight of the formulation before drying; and
   blending (1) the caulk or caulk base material; (2) the thickening agent; and the (3) detackifier into a formulation.

13. The method of claim 12 wherein the caulk or caulk base material is a commercially available caulk.

14. The method of claim 13 wherein the caulk or caulk base material is a blend of white and clear caulks.

* * * * *